UNITED STATES PATENT OFFICE.

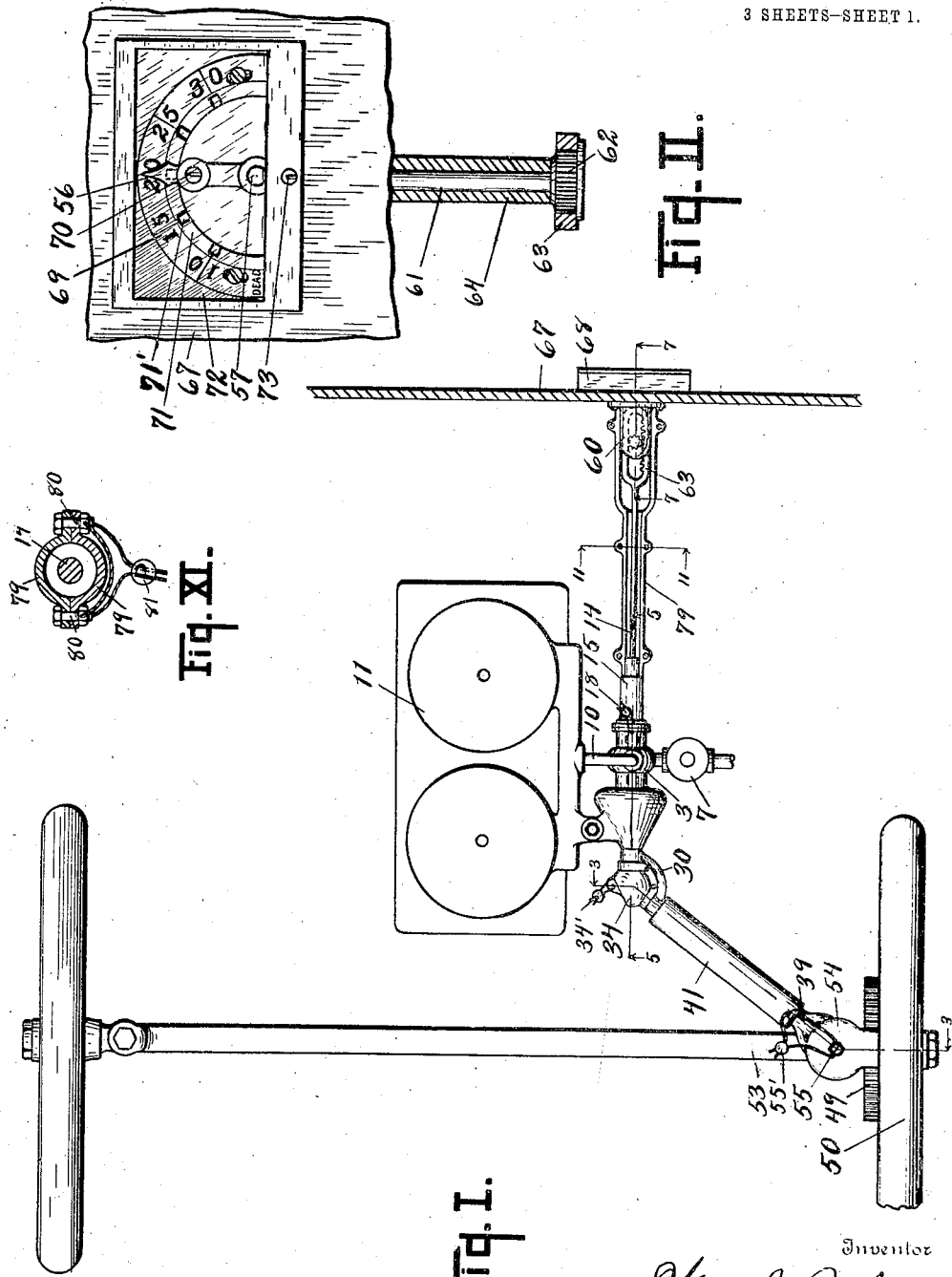

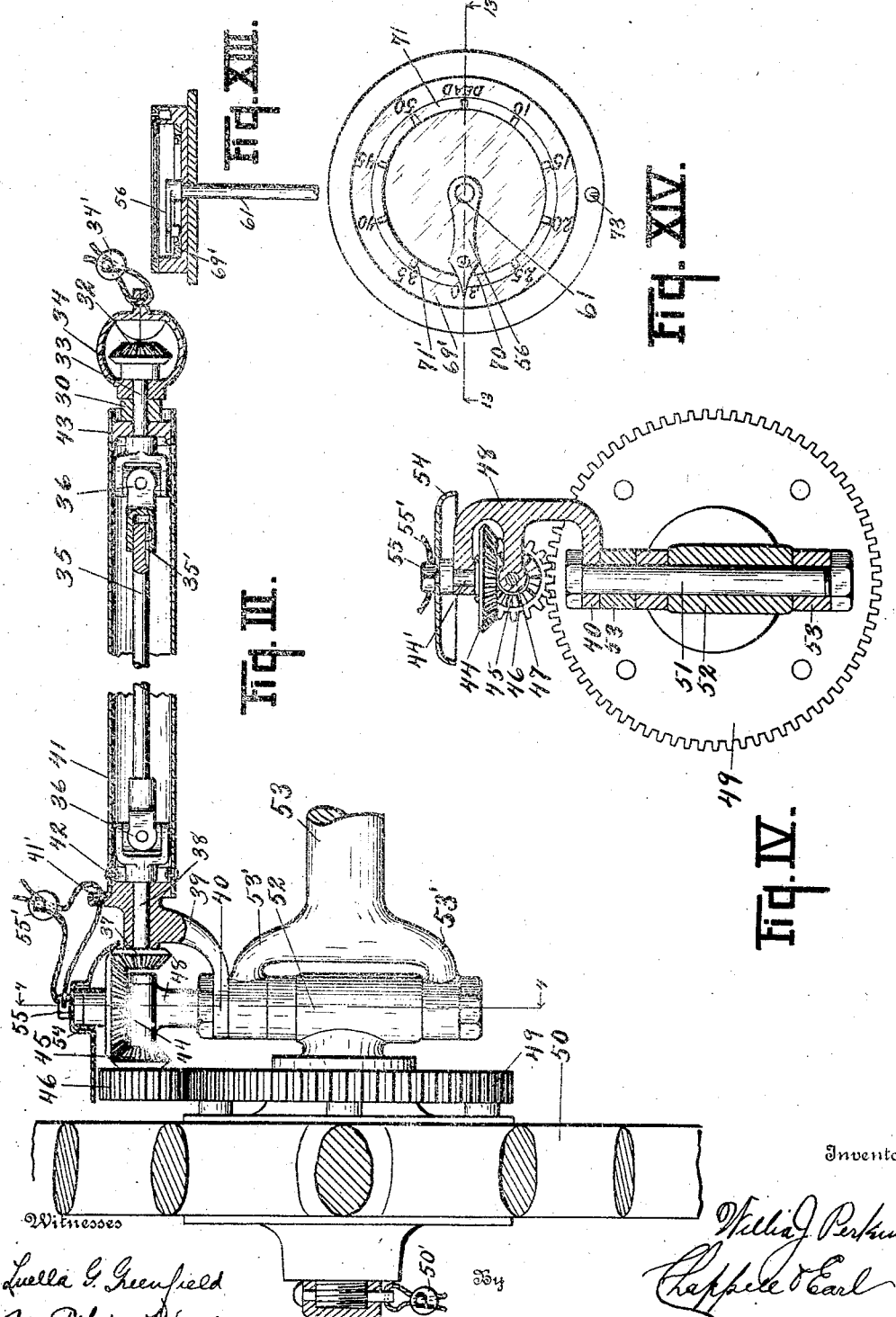

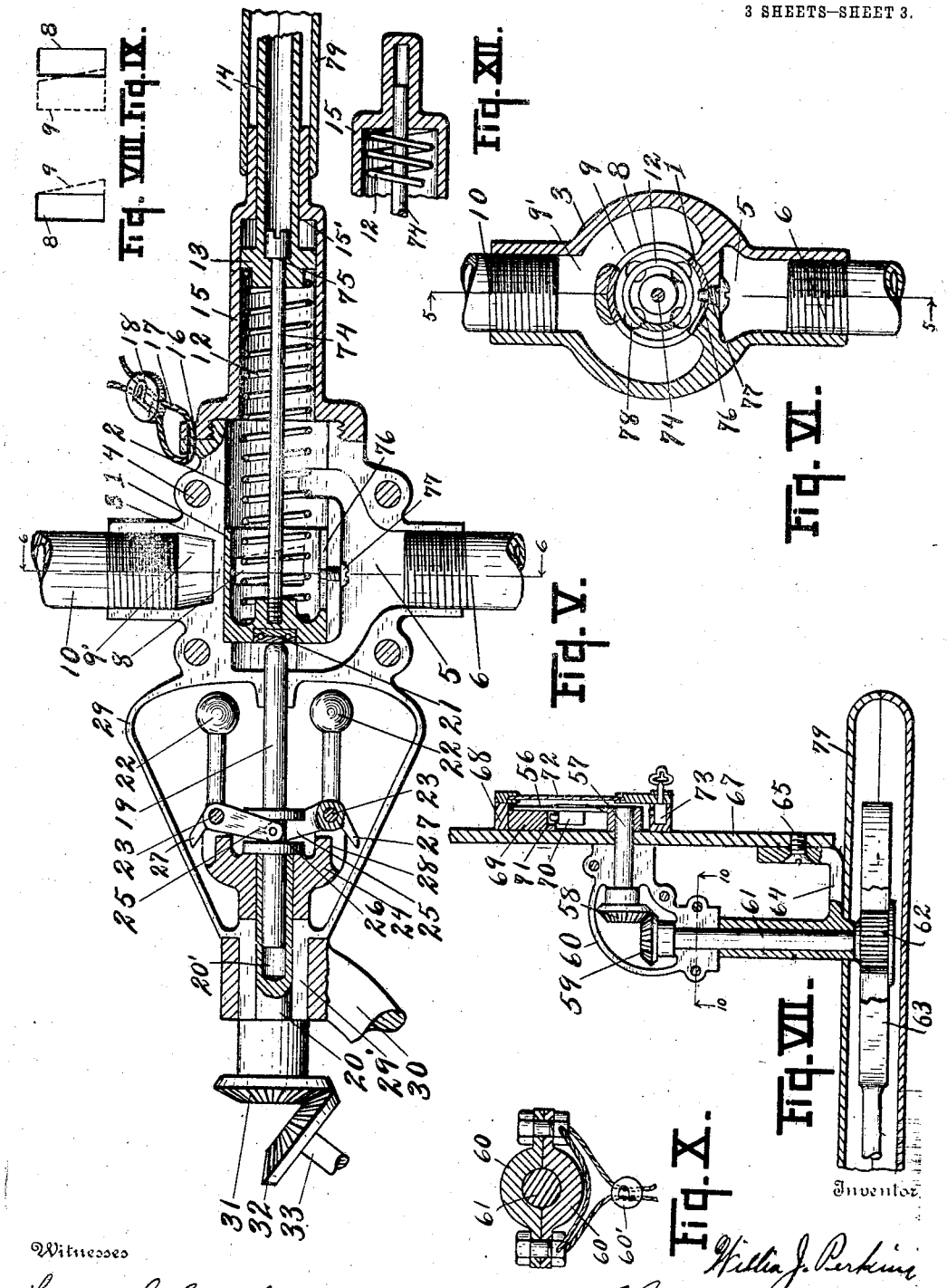

WILLIS J. PERKINS, OF GRAND RAPIDS, MICHIGAN.

SPEED CONTROL FOR SELF-PROPELLED VEHICLES.

1,083,701.  Specification of Letters Patent.  Patented Jan. 6, 1914.

Application filed July 12, 1911. Serial No. 638,206.

*To all whom it may concern:*

Be it known that I, WILLIS J. PERKINS, a citizen of the United States, residing at Grand Rapids, Michigan, have invented certain new and useful Improvements in Speed Control for Self-Propelled Vehicles, of which the following is a specification.

This invention relates to improvements in speed control for self propelled vehicles.

The objects of the invention are, First, to provide a simple and effective device regulated by the speed of the vehicle for controlling the motive power and the consequent speed of the vehicle. Second, to provide such a device which is especially adapted to apply to the driven wheel and steering knuckle of an automobile or power propelled vehicle. Third, to provide such a device with a locking dial and means so that the same may be readily adjusted and controlled, and of such a character that it may be located so that the dial may be in any desired position and be observed either from the front or rear seat or elsewhere, as the case may be. Fourth, to provide improved connections with a dial finger for effectively adjusting a governor operated by a vehicle wheel.

Further objects and objects pertaining to details and economies of construction will definitely appear from the detailed description to follow.

I accomplish the objects of my invention by the devices and means described in the following specification.

The invention is clearly defined and pointed out in the claims.

A mechanism constituting an effective and preferred embodiment of the features of my invention is fully illustrated in the accompanying drawing, forming a part of this specification, in which:

Figure I is a plan view of my improved speed control device as applied to an automobile, the gear framework, engine and other parts of the automobile necessary to understand my invention being indicated diagrammatically. Fig. II is an enlarged front elevation view of the dial and locking mechanism on the dash board of an automobile, a part of the dash being broken away and the rack and pinion parts being in section. Fig. III is an enlarged detail sectional view through the gear and driving connections and through the mechanism attached to the steering knuckle, taken on the irregular section line 3—3 of Fig. I, the parts being in broken section. Fig. IV is a detail sectional view taken on a line corresponding to line 4—4 of Fig. III, showing the gear connections to the front wheel and the bevel gears for driving my improved speed control and the manner of connection to the knuckles. Fig. V is an enlarged detail sectional view taken on a line corresponding to line 5—5 of Figs. I and VI, through the centrifugal governor and the control valve for throttling the engine, and the means to adjust the same. Fig. VI is a detail sectional view taken on a line corresponding to line 6—6 of Fig. V, through the balanced valve and the valve casing and connected parts. Fig. VII is an enlarged detail sectional view taken on a line corresponding to line 7—7 of Fig. I, showing the details of connection for adjusting the valve and the governor means, portions being shown in full lines. Figs. VIII and IX show the relation of the ports of the valve and the valve casing whereby the gradual and regular control of the throttle is secured by the governor. Fig. X is a detail transverse sectional view taken on a line corresponding to line 10—10 of Fig. VIII, showing the casing of the shaft 61 and method of sealing the same. Fig. XI is a detail transverse sectional view taken on a line corresponding to line 11—11 of Fig. I, showing the casing of the shaft or rod 14 and method of sealing the same. Fig. XII is a detail sectional view similar to that of Fig. V, of a modification of the regulating means, in which the adjusting feature is omitted. Fig. XIII is a detail sectional view taken on a line corresponding to line 13—13 of Fig. XIV, showing a modification of the dial and control mechanism. Fig. XIV is a plan view of a modification of the dial such as is illustrated in Fig. II.

In the drawing the sectional views are taken looking in the direction of the little arrows at the ends of the section lines, and similar numerals of reference refer to similar parts throughout the several views.

As the control and operation of a throttle governing valve is the main object of this structure, in referring to the description I will make that the beginning of the description.

Referring to the numbered parts of the drawing, the throttling governor valve 1 is a hollow cylindrical balanced valve, and is adjustable and controllable within the cylindrical valve casing 2. A boss 3 is on this casing, to which is connected the supply pipe or manifold 10 of the engine 11. The valve casing is made in halves which are secured together by bolts or screws 4.

A supply passage 5 is connected to the pipe 6 which leads thereto from the carbureter 7, illustrated in Fig. I. The port 8 in the valve and the port 9 with which the same registers are of any suitable form, preferably so that the opening and closing of the ports through valve control of same regulates the charge admission in such manner as to secure smooth vehicle motion. The port 9 opens into chamber 9' leading to the engine 11, through the pipe 10.

A spring 12 rests against the adjustable head 13 and urges the valve 1 against the governor stem 19 with yielding pressure. The adjustable head 13 is connected to the tubular piston rod 14 by bolt or valve stem 74, and is adjustable within the cylindrical slide way 15 whereby the tension on the spring 12 can be varied at the will of the operator, and the action of the governor be regulated. The outer end of the slideway 15 has an inwardly projecting annular shoulder or stop member 15' which cooperates with the head 13 and locates the valve 1 in its closed position. These parts are connected to take this position when the pointer is at "dead" on the dial.

The slideway 15 is retained in place by a suitable screw thread on the valve casing, and a seal 18 is put upon the same by having a cable 17 threaded through registering holes 16 between the parts thus joined, as clearly appears in Fig. V. This makes it impossible to open the device to tamper with it after it has been properly adjusted.

A governor stem 19 is suitably guided in the governor case 29, and is suitably supported at 20' in the shaft 20, and is disposed to rest against the thrust ball bearing plate 21 on the end of the valve 1, whereby when the governor operates it forces the valve against the compression of the spring 12. The governor is a centrifugal acting governor and may be of any effective form. Each weight 22—22 is pivoted on the head 24 at 23—23, having inwardly projecting fingers 25 which engage in a grooved collar 26 thereon, so that as the device is speeded up the governor weights are thrown outwardly and exert a control upon the balanced valve 1 by their action on the governor stem. Stop fingers 27 are on the weights, which coact with corresponding stop members 28 on the head 24.

The governor case 29 is extended into a suitable sleeve 29' in which is journaled the shaft 20. The sleeve 29' is supported in yoke 30, in which yoke the shaft 33 is also journaled, as will be clearly seen by an examination of Figs. I, III and V.

A bevel gear 31 is on the shaft 20 and meshes with the bevel gear 32 on the shaft 33. The shaft 33 is the driving shaft and the shaft 20 is the driven shaft of this pair of shafts. An oil tight protecting casing 34 embraces these bevel gears 31 and 32, so that they may run in oil, and the parts are protected by seal 34'.

The shaft 35 is connected at both ends by universal joints 36, at one end to the shaft 33 and at the opposite end to shaft 38. It has a slip connection 35' at one end, as is clearly seen in Fig. III. The end of the shaft 35 is slotted longitudinally with a slot-like key way and is engaged by a fin screw or pin in the coupling 35'. Any sliding joint locked against rotation may be employed. On the outer end of the shaft 38 is a bevel gear 37. The shaft 38 is supported by the arm 39 of the bracket 40, being journaled therein.

A tubular casing 41 is secured and sealed by seal 55', arranged through ear 41' thereof, to the arm 39 and embraces and seals the universal joint 36 of the shaft 35, and is free to slip back and forth over a suitable head 43 to accommodate the shifting and changing lengths of the said shaft. The same may be of such structure that it will retain the necessary lubricant inside and it avoids the exposure of revolving parts, and by entirely incasing the same prevents their being tampered with.

The bevel gear 37 meshes with the bevel gear 44, which is driven by the bevel gear 45. The gear 45 is keyed or secured on the shaft 47 on which is also secured the pinion 46. The pinion 46 is driven by the spur gear 49 which is secured to the front wheel 50, and by this means the bevel gear 45 is driven. A seal 50' is on the hub cap.

The upwardly projecting arm 48 contains the journal bearings for the shaft 47 and also is extended and carries the vertical pin 44' for the pinion bevel gear 44, and constitutes a yoke for these parts. A steering knuckle 52 is pivoted on the vertical pin 51, and is disposed between the forks 53' of axle 53. The bracket 40 is pivoted on this pin 51. A protecting shield or cap 54 is placed over these parts and is secured in place by the screw 55. These parts are sealed by the seal 55' (see Fig. III).

It will thus be seen that the parts are assembled in such a way that they cannot be disassembled or tampered with without breaking one or more of the various seals referred to, as there are no nuts or bolts exposed that can be loosened and all moving parts are incased. It will be seen also that the governor is preferably driven from one of the driven wheels of the motor vehicle, and consequently will be regulated by the rate of travel thereof, as distinguished from the revolution per minute of the motor which drives the same. The advantage of this is very clear, because in a shifting gear device the revolutions of the motor will vary to maintain the vehicle speed and when the gear is shifted to the high speed of the sliding gear transmission employed in a motor vehicle, the power of the motor will be very greatly curtailed if the revolutions per minute of the engine are reduced by the engine governor control so as to secure a predetermined vehicle speed regulation. Also, in the event of the slipping of a drive wheel, the same disadvantage follows. I, therefore, preferably connect the speed control device to a driven wheel as distinguished from a drive wheel. My device will do the work more effectively on any wheel that does not slip on the road.

It will be seen that the vehicle speed is under control by varying the pressure or tension on the spring 12, which is done by adjusting the piston rod 14. The means for adjustment are simple. On an extension of this piston rod 14 is a loop 60 containing a rack gear 63. A pinion 62 is within the loop and is guided thereby and meshes with the rack 63. This pinion is supported on the vertical rock shaft 61 which is journaled in the bracket 64 which is secured by the screws 65 to the dash board 67, as clearly appears in Fig. VII. On the upper end of this shaft 61 is a bevel gear 59 meshing with a bevel gear 58, the parts being within a suitable casing 60 which also serves as a yoke and support for the same. The casing 60 is provided with seal 60' (see Fig. X). The bevel gear 58 is on the rock shaft 57 which terminates in or carries a hand or pointer or indicator 56, which swings over a dial 69 to indicate its position and the desired speed limit at which the machine is set. The speed limit for each point marked is indicated by suitable numerals or markings, as appears in Fig. II. Any suitable markings or dial may be used.

Notches 71 are in segment 71' and a lock 70 (which may be a Yale or of any suitable kind) on the pointer coöperates with the said notches so that the finger or pointer 56 can be locked at any desired position and in that way absolutely control the limit of the rate of travel of the machine. The dial is within frame 68. A door 72 is provided (a transparent door being shown), and is locked by the lock 73 so that a double lock is provided for the protection of the adjusting means. By this device it will be seen that the speed limit of the machine may be under the control of two persons, if that be desired. One person may have a key for the lock 73 and another person may have a key for the lock 70, and the presence of both persons with their keys will then be required. The double lock is extra protection where one person carries both keys.

The dial 69 is slotted and made adjustable in relation to the segment 71' so that it can be set with accuracy. I also provide a notch in the dial at the dead point so that the machine can be locked up and its use entirely prevented by an unauthorized person. Also, by this device, the owner can, while in the car, control the speed of his car or stop same, and insure obedience to instructions by the driver.

In this connection I might say that the piston rod 14 is made hollow for the purpose of inserting telescoping or sliding screw rod or valve stem 74, which is shouldered at 75, and is screwed into the valve 1, as clearly appears in Fig. V. Also, the valve 1 is prevented from rotation by the screw threaded pin 77 which enters into longitudinal slot 76 in the periphery of the valve.

Where it is not desired to vary the speed and secure controllable adjustment for various vehicle speeds, the dial mechanism may be omitted and all connections therefor, in which event the tension of the spring 12 may be determined so as to secure the predetermined maximum vehicle speed, and be sealed in place. This predetermined maximum speed can thereafter only be altered by breaking the seals and substituting another spring of different tension and resealing. The end of the tubular casing 15 may be made in the form appearing in Fig. XII, and the valve stem will simply play freely in a suitable socket provided therefor, or the valve stem itself and its guiding socket may be omitted, as the parts under such circumstances will not need to be specially guided.

I desire also to state that to completely balance the valve 1, I perforate the head of it by suitable holes 78. By this means the valve is completely balanced at all times whether there is pressure or suction.

While in Figs. II and VII I have shown the preferred arrangement of dials, I desire to state that a small dial can be associated with the shaft 61, thus omitting many parts, in which event the dial may be a complete circle, as 69' (see Fig. XIV). All other parts of the mechanism are identical with the dial mechanism illustrated in Fig. VII, and are correspondingly numbered, and consequently will not require further description. This construction eliminates many parts, with a corresponding saving in cost.

The operation of my speed control mechanism will be very clear from an inspection of the same, and I believe will not need to be gone into in detail.

The adjustment of the pointer on the dial through its connections regulates the pressure on the spring 12, consequently varies the resistance of the governor, and because the governor is driven from one of the carrying wheels, the speed of the vehicle is under complete control. This is accomplished without in any way hampering or interfering with the full power of the engine or motive power, if same is required to maintain vehicle speed.

It is thus seen that when this improved vehicle speed control is used on any type of motor driven vehicle, where a variable predetermined and adjustable lock speed is desired or required, whether the same is controlled by speed law, public safety, timidity, convenience or inexperience of owner, passenger or driver, for commercial purposes or vehicle or road conditions, or other reasons, any speed within the power of the motor and adjustment provided is instantly secured and fixed by any person provided with the key or combination of lockable adjusting means.

I have shown the mechanism in a form preferred by me which I have been at great pains and expense to develop. However, I know from experience that the same can be very greatly varied in details without departing from my invention. I find the shaft and universal joints and slip joints very desirable in this connection, as they permit freedom of movement of the body on the running gear, yet I am aware that other flexible connections might be provided for the purpose. In some structures and for certain purposes, the flexible connections may not be needed.

I have described the lock for the casing and for the indicator as being key controlled. I desire to say that a permutation lock might be utilized and be the full equivalent of the key controlled lock.

I have shown the structure acting through a throttle to control the charge supply of an explosion engine, and find that especially valuable and desirable by way of accomplishing the desired result. However, this control means is adapted to control any sort of motor and may control it in many different ways, which ways are so numerous that I do not attempt to describe and illustrate the same. I, however, desire to claim tne structure specifically as I have produced it, and also broadly as I have indicated in the appended claims.

Having thus described my invention, what I claim as new and desire to secure by Letters Patent is:

1. In a speed control device for power driven vehicles, the combination with a carrying wheel, a gear carried thereby, a suitable weight governor, a protected connection from the said gear to the said weight governor, a throttle valve disposed to be acted upon by the said governor, a spring for holding the said throttle valve yieldingly against a movable part of the governor and controlled thereby, means to adjust the tension of said spring, a dial, an indicator arm for said dial, with connection to said tension means for adjusting the same by the movement of the said indicator arm, a key controlled lock for locking the said indicator to the said dial at any required position, and a casing with suitable key controlled lock for said dial, coacting substantially as described and for the purpose specified.

2. In a speed control device for power driven vehicles, the combination with a carrying wheel, a gear carried thereby, a suitable weight governor, a protected connection from the said gear to the said weight governor, a throttle valve disposed to be acted upon by the said governor, a spring for holding the said throttle valve yieldingly against a movable part of the governor and controlled thereby, means to adjust the tension of said spring, a dial, an indicator arm for said dial, with connection to said tension means for adjusting the same by movement of the said indicator arm, and a key controlled lock for locking the said indicator to the said dial at any required position, coacting substantially as described and for the purpose specified.

3. In a speed control device for power driven vehicles, the combination with a carrying wheel, a gear carried thereby, a suitable weight governor, a protected connection from the said gear to the said weight governor, a throttle valve disposed to be acted upon by the said governor, a spring for holding the said throttle valve yieldingly against a movable part of the governor and controlled thereby, means to adjust the tension of said spring, a dial, and an indicator arm for said dial, with connection to said tension means for adjusting the same by the movement of the said indicator arm, coacting substantially as described and for the purpose specified.

4. In a speed control device for power driven vehicles, the combination with a carrying wheel, a gear carried thereby, a suitable weight governor, a protected connection from the said gear to the said weight governor, a throttle valve disposed to be acted upon by the said governor, a spring for holding the said throttle valve yieldingly against a movable part of the governor and controlled thereby, means to adjust the tension of said spring, a dial, and an indicator for said dial, with connection to said tension means for adjusting the same by the movement of the said indicator, coacting substantially as described and for the purpose specified.

5. In a speed control device for power driven vehicles, the combination with a carrying wheel, a gear carried thereby, a suitable weight governor, a protected connection from the said gear to the said weight governor, a throttle valve disposed to be acted upon by the said governor, a spring for holding the said throttle valve yieldingly against a movable part of the governor and controlled thereby, means to adjust the tension of said spring, means for sealing said parts, a dial, an indicator arm for said dial, with connection to said tension means for adjusting the same by the movement of the said indicator arm, a key controlled lock for locking the said indicator to the said dial at any required position, and a casing with suitable key controlled lock for said dial, coacting substantially as described and for the purpose specified.

6. In a speed control device for power driven vehicles the combination with a carrying wheel, a gear carried thereby, a suitable weight governor, a protected connection from the said gear to the said weight governor, a throttle valve disposed to be acted upon by the said governor, a spring for holding the said throttle valve yieldingly against a movable part of the governor and controlled thereby, means to adjust the tension of said spring, means for sealing said parts, a dial, an indicator arm for said dial, with connection to said tension means for adjusting the same by the movement of the said indicator arm, and a key controlled lock for locking the said indicator to the said dial at any required position, coacting substantially as described and for the purpose specified.

7. In a speed control device for power driven vehicles, the combination with a carrying wheel, a gear carried thereby, a suitable weight governor, a protected connection from the said gear to the said weight governor, a throttle valve disposed to be acted upon by the said governor, a spring for holding the said throttle valve yieldingly against a movable part of the governor and controlled thereby, means to adjust the tension of said spring, means for sealing said parts, a dial, and an indicator arm for said dial, with connection to said tension means for adjusting the same by the movement of the said indicator arm, coacting substantially as described and for the purpose specified.

8. In a speed control device for power driven vehicles, the combination with a carrying wheel, a gear carried thereby, a suitable weight governor, a protected connection from the said gear to the said weight governor, a throttle valve disposed to be acted upon by the said governor, a spring for holding the said throttle valve yieldingly against a movable part of the governor and controlled thereby, means to adjust the tension of said spring, means for sealing said parts, a dial, and an indicator for said dial, with connection to said tension means for adjusting the same by the movement of the said indicator, coacting substantially as described and for the purpose specified.

9. In a speed control means for power driven vehicles, the combination with one of the carrying wheels, of a gear carried thereby, a governor suitably connected to be driven from said gear, a throttle valve operated by the said governor, tension devices for regulating the action of said governor, an indicator connected to said tension device, and a dial to which said indicator may be key locked, coacting for the purpose specified.

10. In a speed control means for power driven vehicles, the combination with one of the carrying wheels, of a gear carried thereby, a governor suitably connected to be driven from said gear, a throttle valve operated by said governor, tension devices for regulating the action of said governor, a casing means embracing the same, an indicator connected to said tension device, a dial to which said indicator may be key locked, and a key controlled locked casing for said dial, coacting for the purpose specified.

11. In a speed control means for power driven vehicles, the combination with one of the carrying wheels, of a gear carried thereby, a governor suitably connected to be driven from said gear, a throttle valve operated by said governor, tension devices for regulating the action of said governor, a casing means embracing the same, an indicator connected to said tension device, and a dial to which said indicator may be key locked, coacting for the purpose specified.

In witness whereof, I have hereunto set my hand and seal in the presence of two witnesses.

WILLIS J. PERKINS. [L. S.]

Witnesses:
 WM. J. HEFFRON,
 PETER TAYLOR.